UNITED STATES PATENT OFFICE.

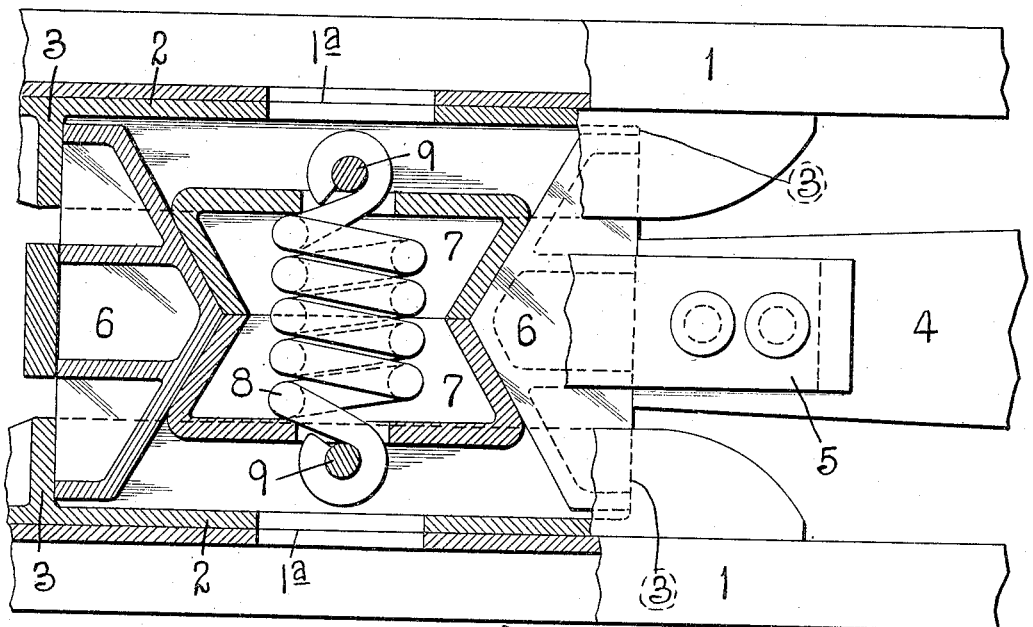
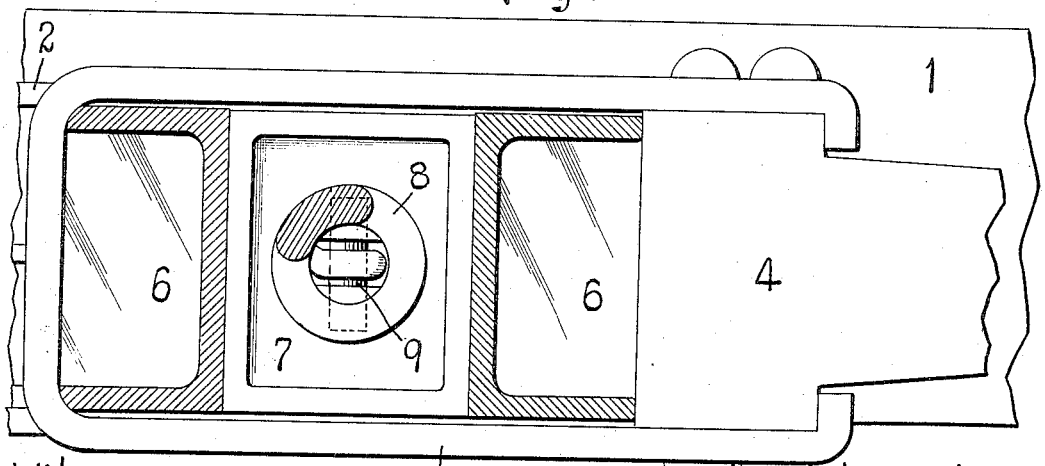

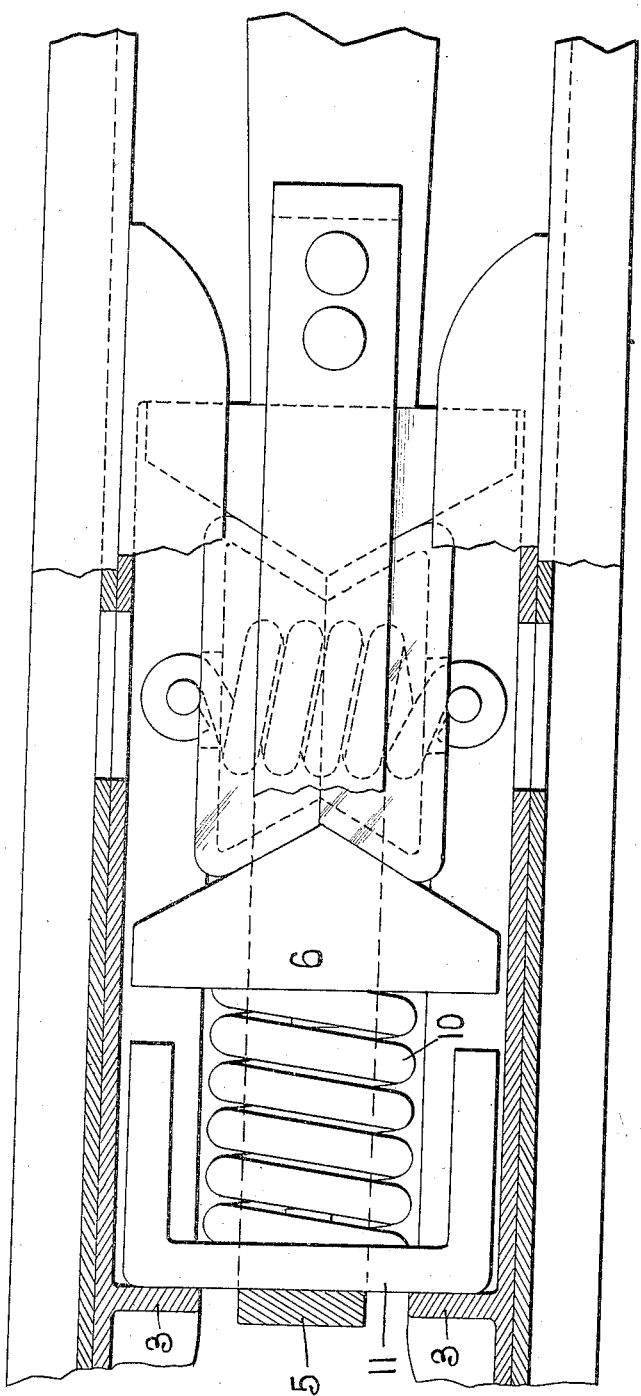

GEORGE I. KING, OF MIDDLETOWN, PENNSYLVANIA.

FRICTION DRAFT-GEAR.

No. 827,804.  Specification of Letters Patent.  Patented Aug. 7, 1906.

Application filed March 10, 1906. Serial No. 305,284.

*To all whom it may concern:*

Be it known that I, GEORGE I. KING, a citizen of the United States, residing at Middletown, Dauphin county, Pennsylvania, have invented a certain new and useful Improvement in Friction Draft-Gear, of which the following is a full, clear, and exact description, such as will enable others skilled in the art to which it appertains to make and use the same, reference being had to the accompanying drawings, forming part of this specification, in which—

Figure 1 is a horizontal sectional view through my improved friction draft-gear. Fig. 2 is a vertical longitudinal sectional view through the same; and Fig. 3 is a view similar to Fig. 1, showing a modified form of my invention.

This invention relates to a new and useful improvement in friction draft-gear, the object being to simplify the construction so that the device may be cheaply made, easily assembled, and readily repaired in the event of breakage or disarrangement of any of the parts and also to reduce the number of parts.

In the drawings, 1 indicates the draft-sills of the car-frame, here shown in the form of channels, and 2 represents the cheek-plates, secured to the draft-sills, said cheek-plates having abutments 3 at their ends, with which coöperate the follower parts of the draft-rigging.

4 is the coupler-shank, and 5 is the yoke thereof. 6 represents friction-followers normally resting against the abutments 3, said followers also coöperating with the yoke and the rear end of the draw-bar, respectively. The apices of these followers are presented inwardly, and the double inclined faces of the followers coöperate with friction-blocks 7, there being a pair of such blocks coöperating with said followers. These friction-blocks 7 are formed hollow and provided with openings in their side walls, through which pass the ends of a tension-spring 8, said spring being held in position by removable rods or bars 9, which extend through eyes in the ends of the spring and engage the outer faces of the friction-blocks 7.

The cheek-plates and draft-sills are preferably slotted, as at 1ª, so as to permit the friction-blocks 7 to be separated and accommodate the outward movement of the spring in such separation.

In operation under pulling and buffing strains the pairs of friction-blocks 7 will be separated, placing the spring 8 under tension and offering resistance to the movement of the active followers.

In assembling the parts one of the rods 9 is placed in position, after which the eye on the opposite end of the spring is drawn through its opening and the other rod 9 dropped into place, the spring being thus drawn under tension in normal position. The friction draft-gear may be assembled within the yoke and introduced bodily in position between the abutments on the draft-sill. Likewise the entire gear may be removed for purposes of repair.

In Fig. 3 I have shown a slightly-modified form of my invention in which a compression-spring 10 and a member 11 are interposed between the yoke 5 and the rear friction-follower 6. This member 11 may be either in the form of an open yoke, as herein shown, or in the form of a hollow sleeve surrounding the compression-spring, and under pulling strains the spring 10 will first be compressed, and then the member 11 will engage the rear friction-follower in the forward movement of the draw-bar yoke. Under buffing strains, the rearward movement of the draw-bar will cause the spring 10 to be first compressed, and then the rear friction-follower will be brought into engagement with the member 11, which normally engages the rear abutments 3.

While I have shown the spring 10 arranged back of the friction-gear in the modification shown in Fig. 3, it will be obvious that said spring could be arranged in front of said friction-gear immediately behind the draw-bar without departing from the scope of my invention.

Having thus described the invention, what is claimed as new, and desired to be secured by Letters Patent, is—

1. In a friction draft-gear, the combination with a plurality of friction-followers having inclined faces, friction-blocks located between said followers and coöperating therewith, and a tension-spring for holding said blocks together; substantially as described.

2. In a friction draft-gear, the combination with a plurality of tapered friction-followers having their apices presented toward each other, laterally-movable friction-blocks having engaging faces which contact with the inner faces of each of said followers, and a spring carried by said friction-blocks and held under tension for connecting said friction-blocks; substantially as described.

3. In a friction draft-gear, the combination with abutments, of spring-followers normally seated against said abutments, a draw-bar shank, and a yoke on said draw-bar shank, said parts coöperating with said followers, and laterally-movable friction-blocks coöperating with said followers, a spring having eyes on its ends which project through openings in said friction-blocks, and bars passing through said spring-eyes and resting against the outer faces of said friction-blocks; substantially as described.

4. In a friction draft-gear, the combination with friction-followers and friction-blocks coöperating therewith, a tension-spring for holding said blocks together, and a compression-spring arranged between the draw-bar yoke and the rear friction-follower; substantially as described.

5. In a friction draft-gear, the combination with friction-followers and friction-blocks coöperating therewith, a tension-spring for holding said blocks together, a draw-bar provided with a yoke, a compression-spring arranged between said yoke and the rear friction-follower, and a member 11, actuated by said yoke under pulling strains and adapted to engage the rear friction-follower after said spring has been compressed; substantially as described.

6. In a friction draft-gear, the combination with rigid follower-abutments, of a friction-follower normally engaging the forward abutment, a coöperating rear friction-follower, friction-blocks between said followers held together by a tension-spring, a member normally engaging the rear abutment, a spring interposed between said member and the rear friction-follower, and a draw-bar shank provided with a yoke within which said member and followers are located; substantially as described.

7. In a friction draft-gear, friction members comprising followers and blocks coöperating therewith, a tension-spring for holding said blocks together, means for actuating said friction members, and a spring arranged between said means and one of the friction members; substantially as described.

In testimony whereof I hereunto affix my signature, in the presence of two witnesses, this 5th day of March, 1906.

GEORGE I. KING.

Witnesses:
E. HOLLER CROLL,
A. M. CROLL.